United States Patent [19]

Rosengren et al.

[11] Patent Number: 5,633,683
[45] Date of Patent: May 27, 1997

[54] ARRANGEMENT AND METHOD FOR TRANSMITTING AND RECEIVING MOSAIC VIDEO SIGNALS INCLUDING SUB-PICTURES FOR EASY SELECTION OF A PROGRAM TO BE VIEWED

[75] Inventors: Jürgen F. Rosengren; Ronald W. Saeijs; Joanne H. Westerink; Michiel J. van der Korst; Guy J. Roberts, all of Eindhoven, Netherlands

[73] Assignee: U.S. Philips Corporation, New York, N.Y.

[21] Appl. No.: 422,379

[22] Filed: Apr. 14, 1995

[30] Foreign Application Priority Data

Apr. 15, 1994 [EP] European Pat. Off. ............ 94201053

[51] Int. Cl.⁶ ................... H04N 7/58; H04N 5/445
[52] U.S. Cl. ........................... 348/385; 348/564
[58] Field of Search ........................ 348/385, 563, 348/564, 565–570, 387, 388; 358/310; H04N 7/58, 5/445

[56] References Cited

U.S. PATENT DOCUMENTS

| | | | |
|---|---|---|---|
| 3,825,674 | 7/1974 | Justice | 348/385 |
| 4,660,096 | 4/1987 | Arlan et al. | 358/310 |
| 5,161,012 | 11/1992 | Choi | 348/563 |
| 5,331,349 | 7/1994 | Kim | 348/568 |
| 5,343,250 | 8/1994 | Iwamura | 348/564 |
| 5,371,549 | 12/1994 | Park | 348/564 |
| 5,398,074 | 3/1995 | Duffield et al. | 348/564 |
| 5,422,674 | 6/1995 | Hooper et al. | 348/409 |
| 5,430,486 | 7/1995 | Fraser et al. | 348/426 |
| 5,434,624 | 7/1995 | Ishimura | 348/563 |
| 5,442,398 | 8/1995 | Koshiro et al. | 348/385 |
| 5,452,012 | 9/1995 | Saitoh | 348/563 |

FOREIGN PATENT DOCUMENTS

| | | | |
|---|---|---|---|
| 0598576 | 5/1994 | European Pat. Off. | |
| 5049016 | 2/1993 | Japan | 348/385 |
| 6006773 | 1/1994 | Japan | 348/385 |

OTHER PUBLICATIONS

"ISO/IEC CD 13818: Information Technology—Generic Coding of Moving Pictures and Associated Audio Information" 1993 12–01.

"ISO/IEC CD 13818-2: Information Technology—Generic Coding of Moving Pictures and Associated Audio Information" Part 2: Video 1993 12–01.

Primary Examiner—Victor R. Kostak
Attorney, Agent, or Firm—Laurie E. Gathman

[57] ABSTRACT

MPEG2-based transmission systems transmit a large number of digital television programs in a single physical channel. Disclosed herein is a "Channel Navigation System" which allows a user to get an overview of the digital programs provided, and to easily select a desired program. The method of the invention includes the transmission (in a separate program of a transport stream) of a video stream representing a mosaic picture, the sub-pictures of which are miniature versions of the video stream of other programs in that transport stream. The method further includes the transmission of information which links the position of each sub-picture within the mosaic picture with the program number from which the sub-picture is derived. The user selects a desired program by merely 'pointing and clicking' its miniature version in the mosaic picture.

19 Claims, 5 Drawing Sheets

ARRANGEMENT AND METHOD FOR TRANSMITTING AND RECEIVING MOSAIC VIDEO SIGNALS INCLUDING SUB-PICTURES FOR EASY SELECTION OF A PROGRAM TO BE VIEWED

FIELD OF THE INVENTION

The invention relates to a transmitter and method for transmitting video signals. The invention also relates to a receiver and a method for receiving video signals.

BACKGROUND OF THE INVENTION

It is known that mosaic pictures comprising a plurality of sub-pictures are transmitted in cable networks. Each sub-picture renders a miniature version of an available television program. The mosaic picture allows a user to obtain an overview of all receivable television programs. However, in order to select a desired television program, the user must know the relevant channel number or associated program number, and enter said number via a remote control device.

OBJECT AND SUMMARY OF THE INVENTION

It is, inter alia, an object of the invention to improve the known arrangement and, in particular, to provide a transmitter for transmitting video signals that assists the user in easily selecting a desired program from the large number of available programs.

According to a first aspect of the invention, this object is achieved by a television transmitter for transmitting a plurality of video signals via a common channel, each video signal having a program number, the transmitter being adapted to generate a mosaic video signal comprising a plurality of sub-pictures, each sub-picture representing one of said plurality of video signals, generate data linking the position of each sub-picture on a display screen with the program number of the associated video signal, and transmit said mosaic video signal and linking data through said common channel.

A corresponding television receiver for receiving and displaying the signals from said transmitter comprises a display screen, a pointing device, means for decoding the program number of a video signal represented by the position of the sub-picture being displayed and pointed at by the display device, and adapted to select said video signal for display.

The invention thus allows a user to select a desired program by simply "pointing and clicking" the corresponding sub-picture on the mosaic screen.

Further aspects of the invention relate more specifically to transmission and reception of digital video signals. A known method of transmitting digital video signals is disclosed in "ISO/IEC CD 13818-1: Information technology—Generic coding of moving pictures and associated audio information—Part 1: Systems", 1993-12-01, also known as the MPEG2 systems standard. The known method comprises the steps of encoding said video signals into respective elementary bitstreams, and multiplexing said elementary bitstreams into a transport stream. The known MPEG2 transmission system is a packet-based multiplex system. Each transport packet belongs to one elementary stream of video, audio or data. One or more elementary streams make up a program. An MPEG2 transport stream comprising a plurality of programs is transmitted through a single physical channel.

According to a second aspect of the invention, a television transmitter for transmitting a plurality of digital video signals, each signal being transform coded into a respective elementary bitstream, comprises means for composing a mosaic picture comprising a sub-picture, each sub-picture representing one of said plurality of video signals, means for encoding said mosaic picture as a further elementary bitstream, means for transmitting said further elementary bitstream, and means for transmitting data linking the position of each sub-picture within the mosaic picture with the associated video signal.

The sub-pictures within the mosaic picture are not necessarily real-time miniature versions of the associated video program. In an attractive embodiment of the invention, at least one of the sub-pictures is characteristic of the television program conveyed by the associated video signal. It is thereby achieved that a user can clearly recognize a program on the mosaic picture, even if the "real" program is temporarily interrupted by e.g. a TV commercial. The corresponding television receiver comprises means for deriving the selected sub-picture from the mosaic signal and means for simultaneously displaying the selected sub-picture and the associated video signal for a predetermined period of time after selecting said video signal. This prevents confusion as to whether or not a program is indeed the selected program if, at the time of selection, a commercial is transmitted.

In a further embodiment, the sub-pictures are characteristic of respective programs scheduled for later transmission, and the linking data includes scheduling data for programming the receiver to automatically display or record said scheduled programs. A television receiver can now easily be programmed to automatically display or record a desired program by "pointing and clicking" the associated sub-picture on the mosaic screen.

Usually, an elementary MPEG video bitstream includes autonomously encoded and predictively encoded pictures comprising transform-coded blocks having DC-coefficients. In an embodiment of the transmitter, the means for composing the mosaic picture comprises means for selecting the DC coefficients of autonomously encoded pictures to constitute said sub-picture. The mosaic picture can thus be derived from the encoded video signals by using a simple MPEG decoder. The mosaic picture is both spatially and temporally reduced and requires only a low bitrate for transmission.

It is to be noted that European Patent Application EP-A 0 598 576 proposes a television signal transmission and reception system with multi-screen display for tuning operations. However, EP-A 0 598 576 was published after the priority date of this patent application.

DESCRIPTION OF EMBODIMENTS

Figure 1:
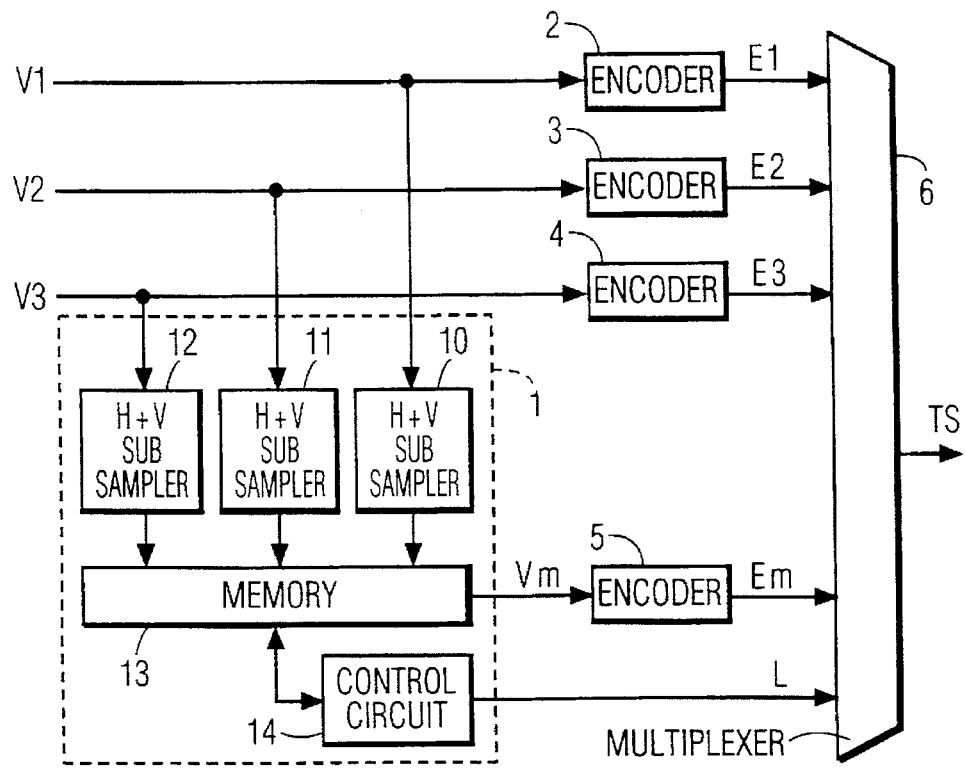
FIGS. 1–4 show embodiments of a transmitter according to the invention.

FIG. 1 shows a first embodiment of a transmitter according to the invention. The transmitter may be located at the head-end of a cable network. The transmitter receives a plurality of video signals by respective satellite, terrestrial or cable receivers (not shown). In the Figure, only three video signals V1, V2, and V3 are shown. They are applied to MPEG2 video encoders 2, 3 and 4, respectively. Said encoders are adapted to encode and compress the respective video encoders according to "ISO/IEC CD 13818-2: Information technology—Generic coding of moving pictures and associated audio information—Part 2: Video", 1993-12-01, also referred to as the MPEG2 video coding standard. Their output signals are elementary bitstreams E1, E2 and E3, respectively. The video signals are further applied to a composing circuit 1 which comprises, for each video signal, a horizontal and vertical subsampler 10, 11 and 12. Each subsampler generates a small-size sub-picture of the respective video picture. The sub-pictures are stored in respective sections of a picture memory 13 under control of a control circuit 14 such that 4*4 or 5*5 sub-pictures occupy a television screen. Control circuit 14 is further adapted to readout the picture memory 13 so as to obtain a mosaic video signal Vm. Said signal Vm is applied to a further MPEG2 encoder 5 for encoding into a further elementary bitstream Em. In the embodiment shown, the elementary bitstreams V1, V2, V3 and Vm are multiplexed by a multiplexer 6 into a transport stream TS. However, the elementary stream Vm may also be transmitted as a separate transport stream. Control circuit 14 is further adapted to generate linking data L and to add said linking data to transport stream TS.

Figure 2:
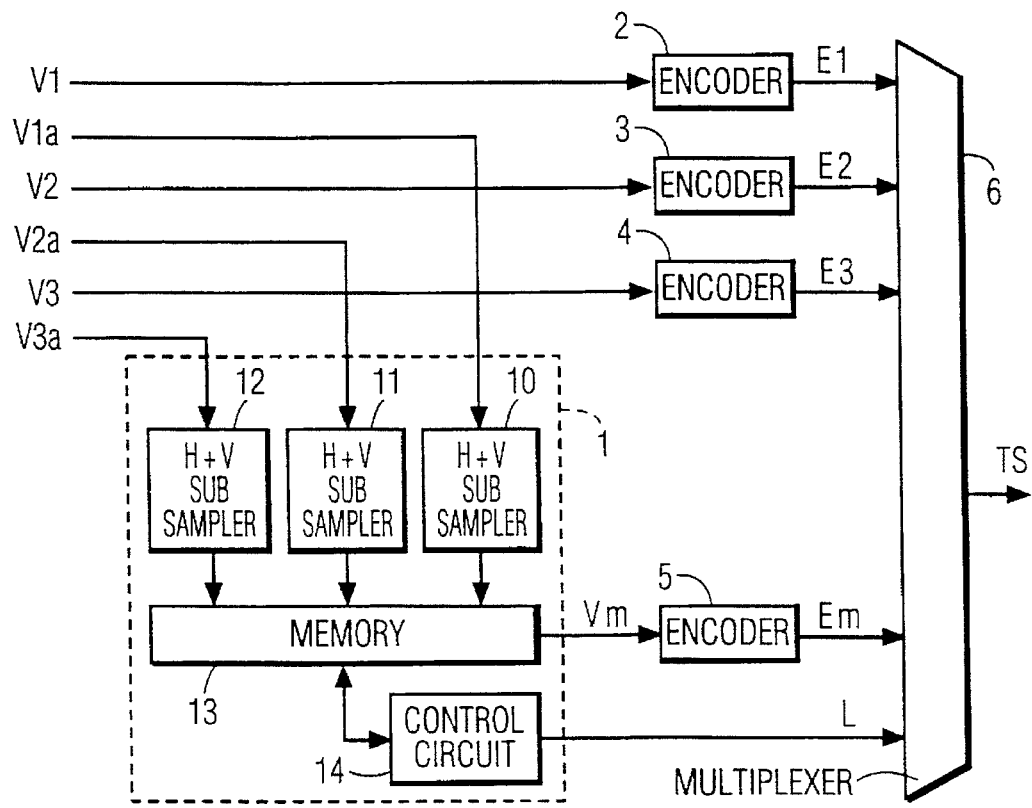

FIG. 2 shows a second embodiment of the transmitter. This embodiment differs from the first in that the video signals V1 . . . V3 are now locally generated by a respective source (not shown). In addition, each source generates an auxiliary picture, for example a still picture, which is characteristic of the program. As an example, video signal V1 conveys the Oprah Winfrey show, whereas auxiliary signal V1a is a still picture showing Oprah Winfrey. This embodiment is advantageous in that the mosaic screen at the receiver end clearly indicates that the Oprah Winfrey show is being broadcast, even if the program is temporarily interrupted by a TV commercial.

Figure 3:
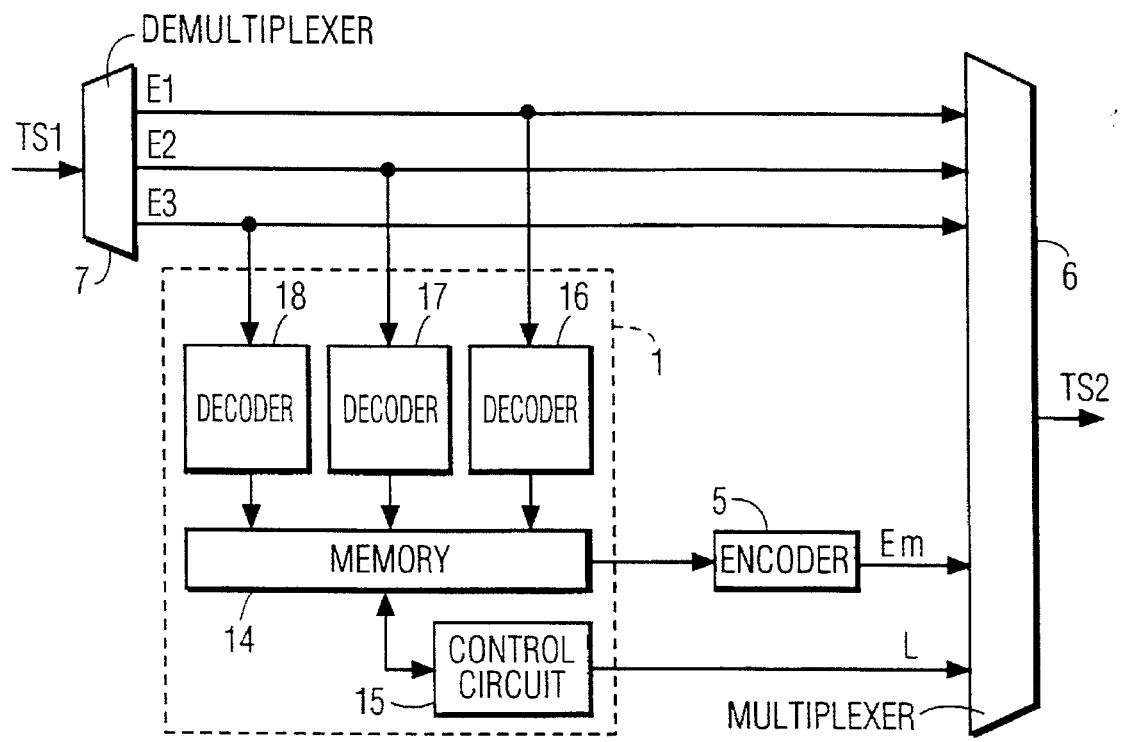

FIG. 3 shows a third embodiment of the transmitter. In this embodiment, the video signals to be transmitted are assumed to be already available as respective MPEG elementary streams E1 . . . E3. They are read from a received transport stream TS1 by a demultiplexer 7 and directly applied to multiplexer 6. They are further applied to composing circuit 1 which now comprises means 16, 17, 18 for decoding the elementary streams and generating the respective sub-picture. Said means may take the form of MPEG decoders in accordance with the MPEG2 video standard. However, "simple" MPEG decoders may be used instead, as will now be explained.

Figure 5:
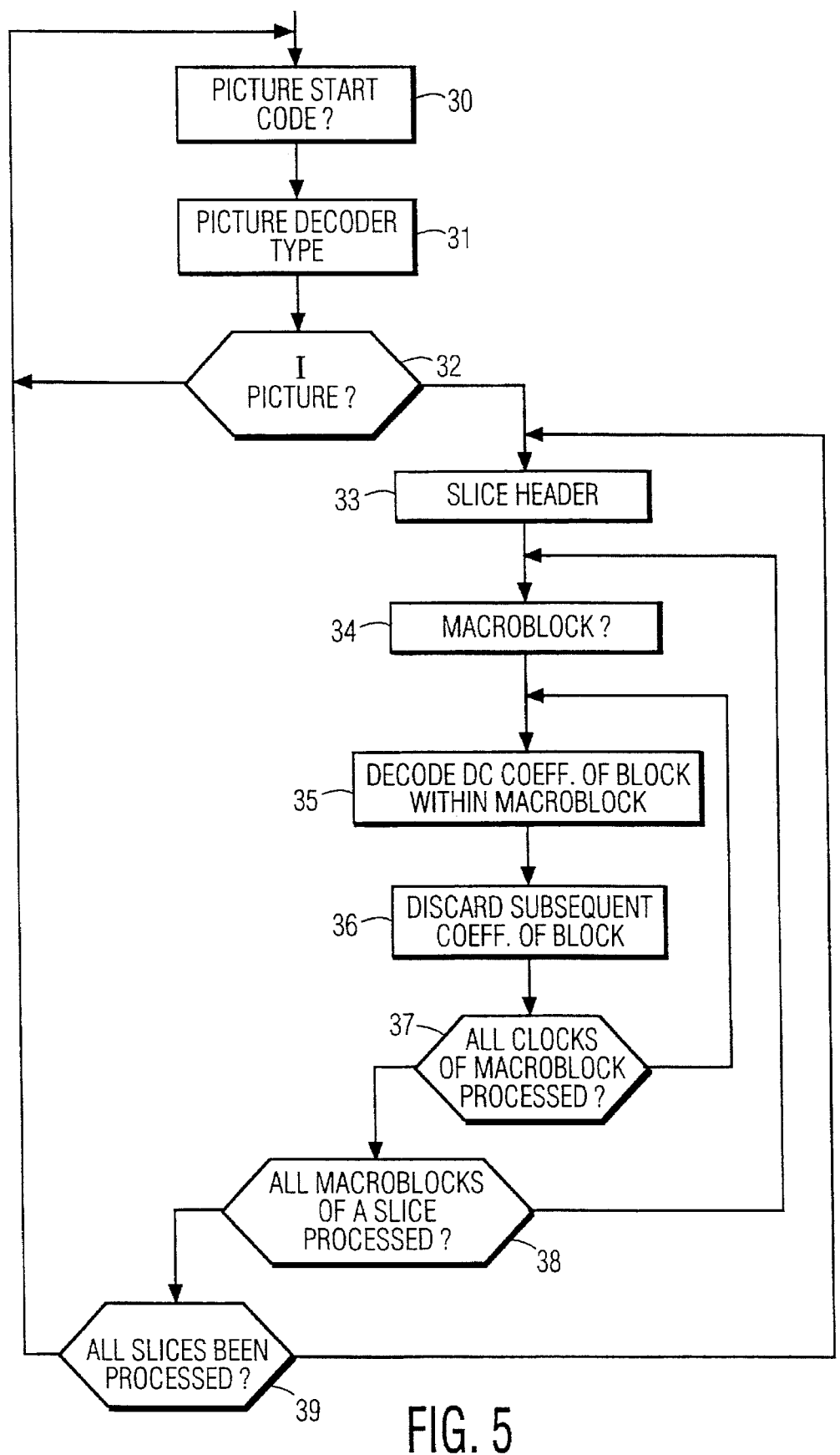
FIG. 5 shows a flowchart illustrating the operation of a decoder shown in FIG. 3.

As is generally known in the field of video encoding, each elementary stream E1 . . . E3 includes autonomously encoded pictures (I-pictures) and predictively encoded pictures (P and B-pictures). The encoded pictures comprise blocks of coefficients, representing spectral components of the video signal. The DC coefficient of autonomously encoded blocks represents the average pixel value of an 8*8 pixel block. This applies in particular to all blocks of the I-pictures. The operation of "simple" MPEG decoders 16 . . . 18 will now be elucidated with reference to a flowchart shown in FIG. 5. In a first step 30, the decoder discards all data until a picture start code is encountered. Data defining a picture is now being received. In a step 31, the picture coding type accommodated in the picture header is decoded. In a step 32, it is ascertained whether said picture coding type indicates that an I-picture is being received. If that is not the case, the decoder returns to step 30 to await the next picture start code. If the picture is an I-picture, the decoder successively awaits the reception of a slice header (step 33) and the reception of a macroblock (step 34).

In a step 35, the decoder decodes and outputs the DC coefficient of a block within the current macroblock. In a step 36, the subsequent coefficients of a block up to the detection of an end-of-block code are discarded. In a step 37, it is ascertained whether all blocks of a macroblock have been processed. As long as that is not the case, the decoder returns to step 35. In a step 38, it is ascertained whether all macroblocks of a slice have been processed. As long as that is not the case, the decoder returns to step 34. Finally, it is ascertained in a step 39 whether all slices of the picture have been processed. As long as that is not the case, the decoder returns to step 33. If all slices have been processed, the decoder returns to step 30 in order to search the next I-picture in the bitstream.

The decoder thus extracts the DC coefficients of I-pictures from the input bitstream. Said coefficients are subjected to inverse quantization and then stored in memory 14 (see FIG. 3). Each DC coefficient represents the average luminance or chrominance value of an 8*8 pixel block and constitutes one pixel of a sub-picture. Decoders 16 . . . 18 are simple because motion compensation circuitry is redundant, and because variable-length decoders merely need to decode a restricted set of variable-length codewords. Moreover, as the sub-pictures are both spatially and temporally reduced, the transmission of the mosaic signal Em requires a very low bitrate.

Figure 4:
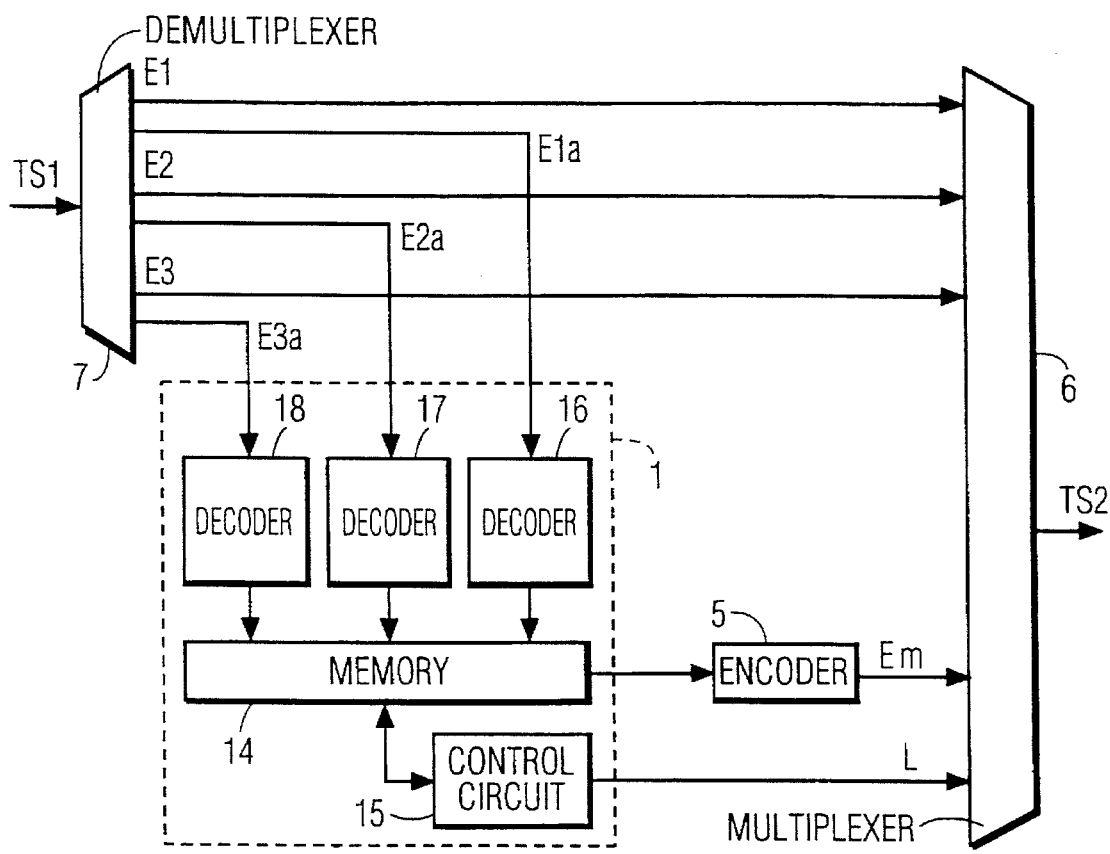

FIG. 4 shows a fourth embodiment of the transmitter. This embodiment differs from the third in that the received transport stream TS1 includes, for each elementary signal E1 . . . E3, a low-bitrate auxiliary elementary stream E1a . . . E3a conveying a low-quality version of the associated elementary stream. More particularly, each auxiliary elementary stream may comprise the DC coefficients of I-pictures only, obtained in a manner as already explained with reference to FIG. 5. In that case, the auxiliary streams E1a . . . E3a are both spatially and temporally reduced versions of the associated main signal. The low-bitrate stream may also convey a still picture which is characteristic of the program.

A method of accommodating the linking data in the transport stream from the transmitter will now be given. As disclosed in the MPEG2 systems standard, transport packets are labelled with a packet identifier (PID), which identifies the elementary stream the packet belongs to. One or more elementary streams make up a program having a program number. A typical program may contain three elementary streams: audio, video and data. The joining of several elementary streams into a program is performed by generating an entry in a program association table which is transmitted in transport packets having a predetermined PID. The program association table contains, for each program, its program number and the PID of transport packets carrying a program map table. The program map table includes a list of the elementary streams making up the program, and their respective PIDs. The program map table may further contain other information about each elementary stream. Said information is transmitted in the form of so-called descriptors.

In an embodiment of the invention, the mosaic picture is transmitted as a program comprising the elementary stream Em and, if desired, an audio elementary stream as well. The associated linking data is transmitted by using a descriptor in the program table as mentioned above. The descriptor is designated mosaic_picture_descriptor. An example of relevant syntax in the program map table is shown in the following Table I:

TABLE I

| mosaic_picture_descriptor | | |
|---|---|---|
| descriptor_tag | 8 | uimsbf |
| descriptor_length | 8 | uimsbf |
| horizontal_partitioning | 4 | uimsbf |
| vertical_partitioning | 4 | uimsbf |
| for (i=0;i<n;i++){ | | |
| program_number | 16 | uimsbf |
| } | | |
| } | | |

Herein, the parameters descriptor_tag and descriptor_length specify the type and length, respectively, of the descriptor. The parameters horizontal_partitioning and vertical_partitioning indicate how many sub-pictures are accommodated in the mosaic picture. The for-clause in the syntax indicates which program number is assigned to each sub-picture, the sub-pictures being ordered, for example, from left to right and from top to bottom.

Figure 6:
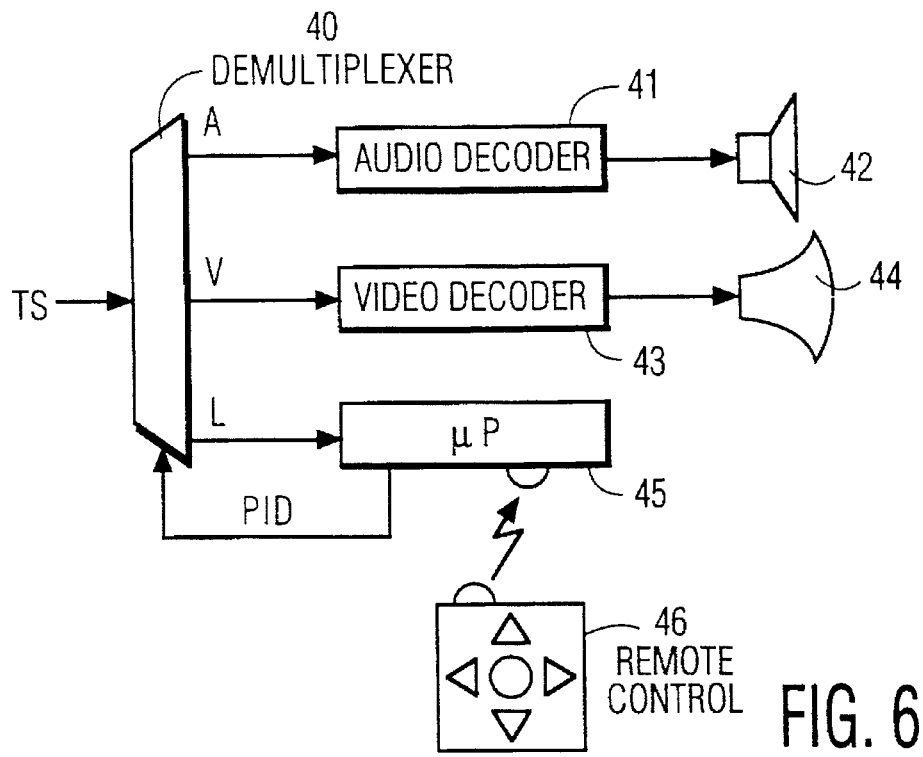
FIGS. 6–7 show embodiments of a television receiver according to the invention.

FIG. 6 shows a first embodiment of a television receiver according to the invention. The receiver comprises a demultiplexer 40, an MPEG audio decoder 41, a loudspeaker 42, an MPEG video decoder 43, a display screen 44, a microprocessor 45 and a remote control device 46. The demultiplexer 40 receives one or more MPEG2 transport streams TS, each comprising a plurality of digital television programs. In a manner known per se, the microprocessor 45 applies to said demultiplexer packet identifiers PID identifying the elementary audio stream A and the elementary video stream V of a desired program, as well as the PID of the packets comprising linking data L. The selected audio stream A is decoded by MPEG audio decoder 41 and reproduced by loudspeaker 41. The selected video stream V is decoded by MPEG video decoder 43 and reproduced on display screen 44. The linking data L is applied to microprocessor 45.

Figure 8:
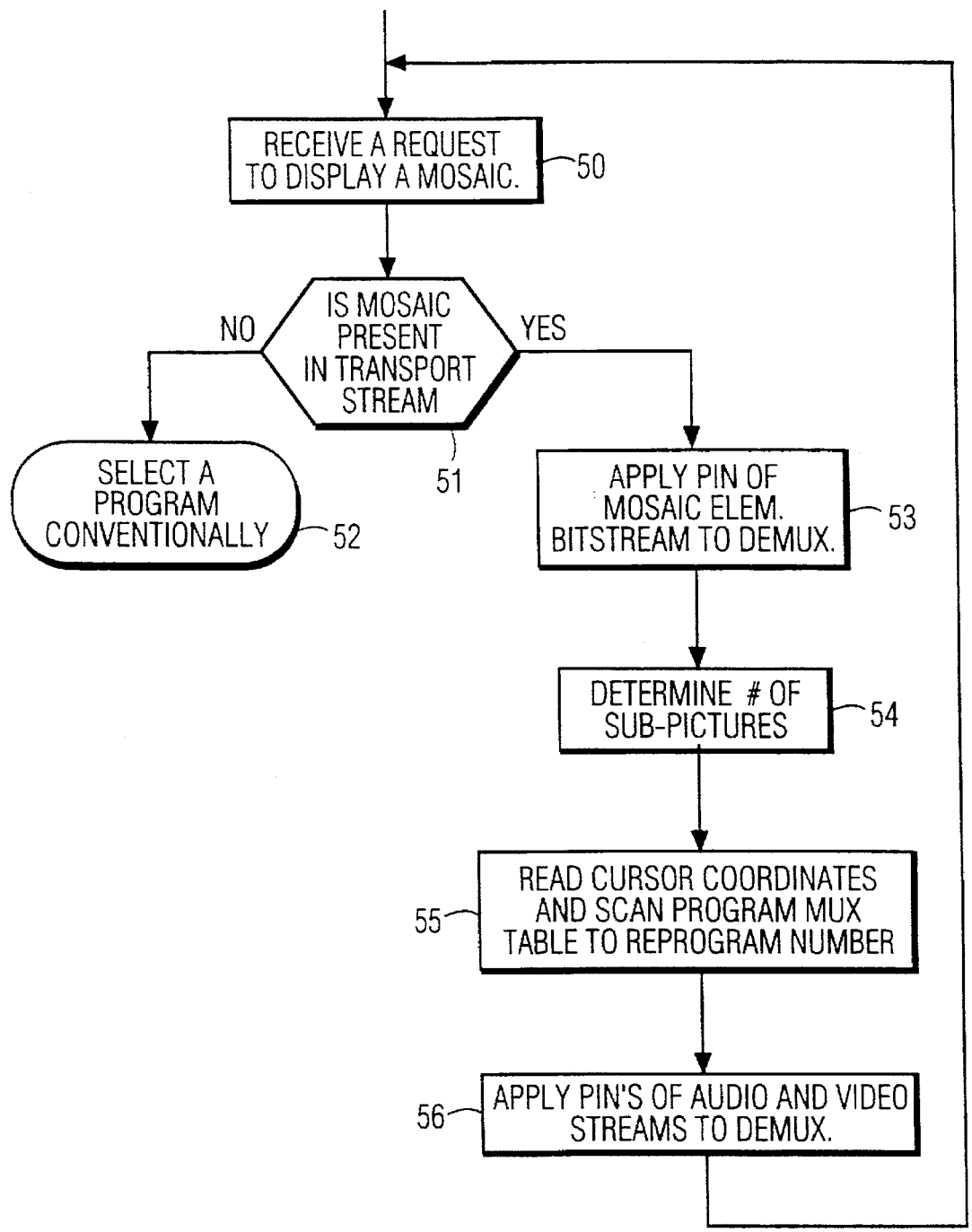
FIG. 8 shows a flowchart illustrating the operation of the television receivers shown in FIGS. 6–7.

The operation of the television receiver will now be elucidated with reference to a flowchart shown in FIG. 8. In a step 50, the microprocessor receives from the remote control unit a request to display the mosaic picture. In a step 51, it is checked whether such a mosaic picture is present in the transport stream TS. This check comprises the reception of the program map table and the analysis of whether or not a mosaic_picture_descriptor is accommodated therein. The receiver thus automatically ascertains whether or not a mosaic picture is transmitted in the transport stream. If a mosaic picture is not available, the program executes a subprogram 52 to allow the user to select a desired television program in a conventional manner.

If a mosaic picture is found to be available, a step 53 is performed in which the processor applies the PID of the mosaic elementary video stream to the demultiplexer. At this stage, the receiver displays the mosaic picture. In a step 54, the microprocessor derives the number of sub-pictures from the parameters horizontal_partitioning and vertical_partitioning in the program map table (see Table I).

Using cursor keys on his remote control device, the user may now move a cursor on the display screen and select one of the sub-pictures displayed thereon. In a step 55, the microprocessor reads the cursor coordinates, and scans the program map table (see Table I) for the associated program number. In a step 56, the PIDs of the elementary audio and video streams associated with said program number are applied to the demultiplexer. The selected television program is now being received. The microprocessor program returns to step 50 so as to await a new request for displaying the mosaic picture.

Figure 7:
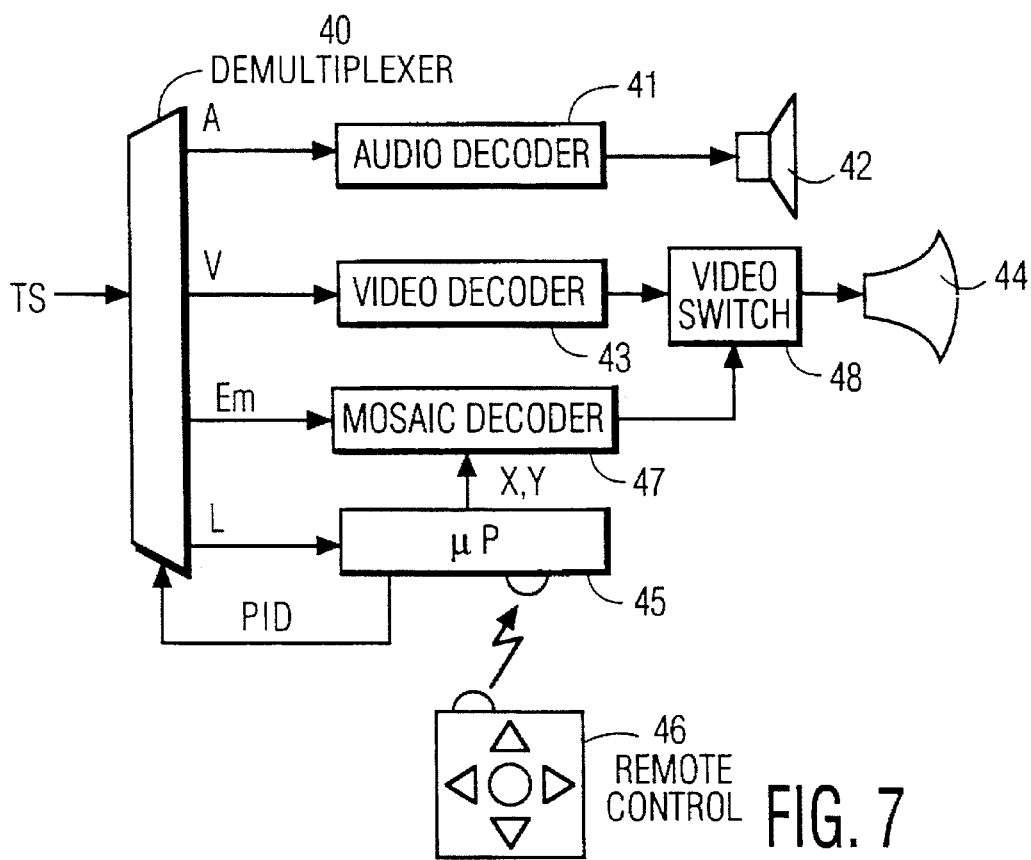

FIG. 7 shows a second embodiment of a television receiver according to the invention. The receiver differs from the first embodiment in that it comprises a further MPEG video decoder 47 and a video switch 48. The further decoder receives the elementary stream Em representing the mosaic signal. The decoder also receives from microprocessor 45 the coordinates X,Y of the sub-picture which has been pointed at by the user. While the first decoder 43 decodes and displays the selected program, the further decoder 47 receives the mosaic stream Em. The further decoder determines for each macroblock in the elementary stream Em whether it belongs to the sub-picture having the coordinates X,Y. If that is the case, the macroblock is decoded and the pixels obtained are applied to video switch 48. The sub-picture being characteristic of the selected program is thus cut out and displayed as a picture-in-picture.

This embodiment is particularly advantageous when the mosaic signal conveys a picture which is characteristic of the associated program. For example, if the Oprah Winfrey show is being broadcast, the associated (still) sub-picture on the mosaic screen may show a photograph of Oprah Winfrey. At any time, the user can deduce from the mosaic picture that the show is being broadcast, even if the show is temporarily interrupted for TV commercials. By cuffing out the (still) sub-picture and displaying it for some period of rime, confusion is avoided as to whether or not the displayed program (commercial) is indeed the selected program (the Oprah Winfrey show).

In summary, the background of this invention is the introduction of digital television by which a large number of programs is broadcast in a single physical channel. As it is difficult for the viewer to get an overview of the services provided, different kinds of "Electronic Program Guides" or "Channel Navigation Systems" are envisaged for the future. The invention relates to a very simple system of this type. The method according to the invention is MPEG2-based and includes the transmission (in a separate program of a transport stream) of a video stream representing a mosaic picture, the sub-pictures of which are miniature versions of the video stream of other programs in that transport stream. The method further includes the transmission of information which links the position of each sub-picture within the mosaic picture with the program number from which the sub-picture is derived. The mosaic picture and the linking information are then used for a simple navigation system.

In general terms, the navigation system functions as follows. The user is watching a certain program and wishes to watch something else. He then switches to the mosaic program, which can be told from the other programs e.g. by the presence of the mosaic_picture_descriptor in its program definition. After locating in the mosaic picture the program he wishes to watch, the user sends a command to the channel navigation system informing it of the location of the corresponding sub-picture in the mosaic picture. This can be done e.g. by 'pointing and clicking'. The channel navigation system then translates that position into a program number using e.g. the information provided in the mosaic_picture_description. Finally, the channel navigation system sends a request to the demultiplexer to select that program.

We claim:

1. A television transmitting system for transmitting a plurality of video signals via a common channel, each video signal having a program number, the television transmitting system comprising:

a mosaic generator tier generating a mosaic video signal comprising a plurality of sub-pictures, each sub-picture representing a corresponding one of said plurality of video signals, at least one of said sub-pictures constituting a non-real-time characterization of a television program conveyed by the corresponding one of said video signals;

a data linking generator for generating data linking the position of each sub-picture on a display screen with the program number of the video signal each sub-picture represents; and a transmitter for transmitting said mosaic video signal and linking data through said common channel.

2. A transmitter as claimed in claim 1, wherein the sub-pictures are characteristic of respective programs scheduled for later transmission, and the linking data includes scheduling data for programming the receiver to automatically display or record said scheduled programs.

3. A television transmitter for transmitting a plurality of digital video signals, each signal being transform-coded into a respective elementary bitstream, the transmitter comprising:

means for composing a mosaic picture comprising a plurality of sub-pictures, each sub-picture representing a corresponding one of said plurality of video signals;

means for encoding said mosaic picture as a further elementary bitstream;

means for transmitting said further elementary bitstream; and means for transmitting data linking the position of each sub-picture within the mosaic picture with the video signal each sub-picture represents.

4. A transmitter as claimed in claim 2, wherein said linking data is transmitted by using an MPEG2 descriptor.

5. A transmitter as claimed in claim 2, wherein the elementary bitstream includes autonomously encoded and predictively encoded pictures comprising transform-coded blocks having DC-coefficients, and wherein the means for composing the mosaic picture comprises means for selecting the DC coefficients of autonomously encoded pictures to constitute said sub-picture.

6. A transmitter as claimed in claim 2, in which at least one of the sub-pictures is characteristic of the television program conveyed by the video signal each sub-picture represents.

7. A transmitter as claimed in claim 2, wherein the sub-pictures are characteristic of respective programs scheduled for later transmission, and the linking data includes scheduling data for programming the receiver to automatically display or record said scheduled programs.

8. A television receiver, comprising:

means for receiving a mosaic picture comprised of a plurality of sub-pictures, each sub-picture representing a corresponding one of a plurality of video signals, each of the video signals conveying a corresponding television program;

a display screen for displaying the mosaic picture;

a pointing device which enables a user to point and click on a selected sub-picture within the mosaic picture being displayed; and, user-responsive means coupled to the pointing device for causing the display screen to display the selected sub-picture in place of the mosaic picture in response to the user pointing and clicking on the selected sub-picture.

9. A receiver as claimed in claim 7, wherein said user-responsive means causes the display screen to display the selected sub-picture in place of the mosaic picture, in response to the user pointing and clicking on the selected sub-picture, for a predetermined period of time after the selected sub-picture is selected, without interruption, even if a program interruption occurs in the corresponding television program during the predetermined period of time.

10. A television receiver for receiving digital video signals which have been transform-coded into elementary bitstreams, a plurality of elementary bitstreams being multiplexed into a transport stream, one of said bitstreams representing a mosaic picture comprising a plurality of sub-pictures, the receiver comprising:

an elementary bitstream decoder for receiving and decoding an elementary bitstream for display on a display screen:

a data linking decoder for receiving and decoding data linking the position of each sub-picture of the mosaic picture with the video signal each sub-picture represents;

user-controlled pointing means for selecting a sub-picture from a displayed mosaic picture; and a controller for controlling the data linking decoder to obtain linking data and identifying the video signal linked with the selected sub-picture, and for controlling the elementary bitstream decoder to receive and decode the elementary bitstream representing said video signal identified by said linking data.

11. A receiver as claimed in claim 8, wherein said linking data is received in the form of an MPEG2 descriptor, and wherein the controller detects the reception of said descriptor and receives and displays, in response to said detection, the elementary bitstream representing the mosaic video signal.

12. A receiver as claimed in claim 10, further comprising means for deriving the selected sub-picture from the mosaic signal and means for simultaneously displaying the selected sub-picture and the video signal each sub-picture represents for a predetermined period of time after selecting said video signal.

13. A method of transmitting a plurality of video signals via a common channel, each video signal having a program number, the method comprising the steps of:

generating a mosaic video signal comprising a plurality of sub-pictures, each sub-picture representing a corresponding one of said plurality of video signals, at least one of said sub-pictures constituting a non-real-time characterization of a television program conveyed by the corresponding one of said video signals;

generating data linking the position of each sub-picture on a display screen with the program number of the video signal each sub-picture represents; and transmitting said mosaic video signal and linking data through said common channel.

14. A method of transmitting a plurality of digital video signals, each signal being transform-coded into a respective elementary bitstream, the method comprising the steps of:

composing a mosaic picture comprising a sub-picture for each of a plurality of video signals;

encoding said mosaic picture as a further elementary bitstream;

transmitting said further elementary bitstream, and transmitting data linking each sub-picture within the mosaic picture with the video signal each sub-picture represents.

15. A method of receiving and displaying signals comprising the steps of:

receiving a mosaic picture comprised of a plurality of sub-pictures, each sub-picture representing a corresponding one of a plurality of video signals, each of the video signals conveying a corresponding television program;

displaying the mosaic picture;

pointing and clicking on a selected sub-picture within the mosaic picture being displayed; and, displaying the selected sub-picture in place of the mosaic picture in response to the step of pointing and clicking on the selected sub-picture.

16. A television signal including a mosaic video signal comprising a plurality of sub-pictures, each sub-picture representing a corresponding one of said plurality of video signals, at least one of said sub-pictures constituting a non-real-time characterization of a television program conveyed by the corresponding one of said video signals, and linking data defining the position of each sub-picture on a display screen and a program number of the corresponding video signal each sub-picture represents.

17. An MPEG2 television signal including a plurality of digital video signals, each signal being transform-coded into a respective elementary bitstream, a further elementary bitstream representing a mosaic picture comprising a plurality of sub-pictures, each sub-picture representing one of said plurality of video signals, and linking data for linking each sub-picture within the mosaic picture with the video signal each sub-picture represents.

18. A signal as claimed in claim 17, wherein said linking data is transmitted by using an MPEG2 descriptor.

19. A signal as claimed in claim 17, wherein the respective elementary bitstreams include autonomously encoded and predictively encoded pictures comprising transform coded blocks having DC-coefficients, and wherein the further elementary bitstream comprises the DC coefficients of said autonomously encoded pictures.

* * * * *